July 30, 1968

C. M. JOHNSON 3,394,658

WAVE PUMP

Filed April 3, 1967

INVENTOR.
CHARLES M. JOHNSON
BY
ATTORNEY

3,394,658
WAVE PUMP
Charles M. Johnson, 13050 Rosecrans Ave.,
Norwalk, Calif. 90650
Filed Apr. 3, 1967, Ser. No. 627,769
9 Claims. (Cl. 103—70)

ABSTRACT OF THE DISCLOSURE

An ocean wave and tide operated pump. A float is connected to a spring biased cam means to operate the pump.

---

The invention comprises pumping apparatus having an ocean wave actuated float for imparting longitudinal movement to an elongated cam member with a series of longitudinally arranged cam for imparting reciprocating motion to a plurality of piston rods and pistons operably connected therein and reciprocally disposed in cylinders provided therefor. The pistons draw a gaseous or liquid fluid such as air for example or water into the respective cylinders and force such air or liquid into a reservoir to build up pressure therein which can be used to operate various mechanisms.

The mechanism has various advantages. It is very simple in construction and has relatively few parts. It is effective and inexpensive in operation so that it provides power at a minimum of cost, the only expense besides the relatively low initial cost being maintenance which is nominal.

Referring to the drawings, which are for illustrative purposes only:

Figures 1, 2, 3:
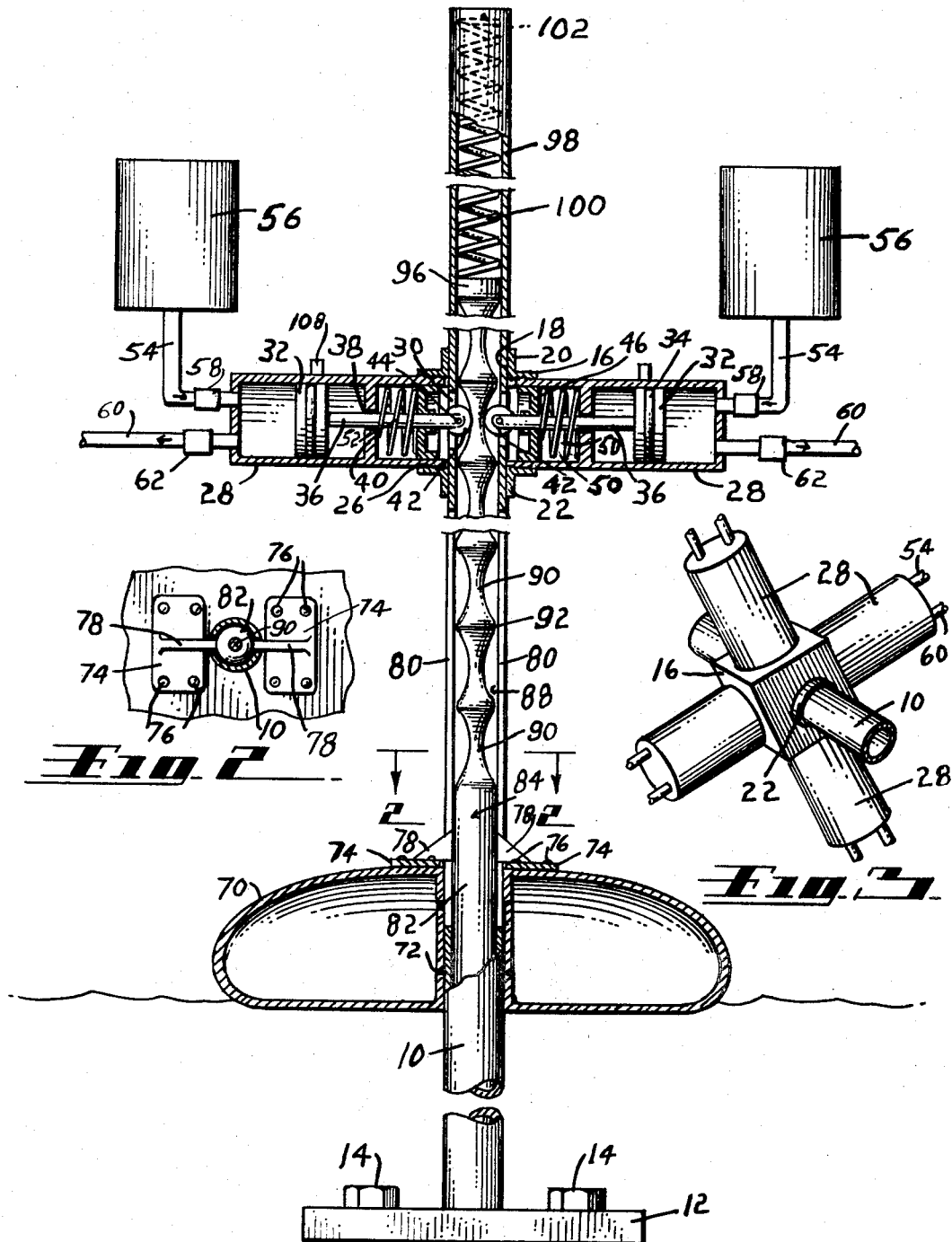
FIG. 1 is a schematic side elevational view, partly in section, of apparatus embodying the present invention.
FIG. 2 is a sectional view taken on line two of FIG. 1.
FIG. 3 is a perspective view of the cylinder arrangement on the supporting column.

Referring more particularly to the drawings, the invention comprises a vertical supporting tubular column which is shown as being a pipe. The lower end of pipe 10 is attached to a horizontal base plate 12 by welding or other suitable means, said base plate having openings therein for screws 14 which are adapted to be secured to a supporting base, not shown. While the base plate arrangement is shown, it is to be understood that any other suitable means may be used to anchor the lower end of the column or pipe 10 to maintain it in position. For example, the lower end of the column could be anchored by cementing same in a bore hole in the ocean floor.

Adjacent the upper end of the pipe 10 is a square block 16 having a passage 18 therethrough for reception of the column or pipe 10, there being upper and lower flanges 20 and 22 extending upwardly and downwardly about the pipe, said block being secured on the pipe by welding or other suitable means.

There is a tapped bore 26 in each side of the block 16 for threadable reception of the externally threaded end portion of a cylinder 28 extending radially relative to the pipe 10 and said pipe has a slot 30 communicating with each cylinder, and said slots 30 are of less length than the interior diameter of the cylinders so that the inner ends of the cylinders abut against adjacent portions of the pipe 10.

Each cylinder has a piston 32 reciprocally mounted therein, there being an annular external groove in said piston for reception of a sealing ring which may be an O-ring 34 of suitable material although any suitable piston ring may be used. Each piston is provided with a piston rod 36 which extends through an opening 38 provided therefor in a partition 40 located intermediate the ends of the cylinder.

Each piston rod has a slot, not shown, in its inner end for reception of a roller 42 which projects through a respective slot 30 and into the interior of the pipe 10. The sides of each piston rod defining its slot have aligned openings therein for reception of a pivot pin 44 which extends through an axial opening in the roller received in said slot. Adjacent the inner end of each piston rod, and spaced outwardly of the roller, is a sliding guide member 46 secured to the piston rod and slidable therewith in the inner portion 50 of the cylinder inwardly of the partition 40, a spring 52 being provided on the piston rod and reacting between the partition 40 and said guide member 46 to urge same inwardly and correspondingly urge its piston inwardly.

Each cylinder has an inlet conduit 54 for air or other fluid and the conduit 54 is provided with a filter 56 at its inlet end. There is also a check valve 58 interposed in said conduit 54, said check valve permitting fluid to be drawn into the cylinder by inward movement of the piston but prevents reverse movement of fluid in conduit 54.

Each cylinder also has an outlet conduit 60 which leads to a reservoir, not shown, or the like. This conduit is provided with a check valve 62 which permits fluid to flow outwardly from the cylinder but prevents reverse flow therethrough.

An upper end portion of the pipe extends above the surface of the ocean and there is a hollow float 70 having a central tubular part 72 in which is slidably received the pipe 10. At the top of float 70 are a pair of plates 74 at diametrically opposite sides of the central part 72 of the float and secured to the top wall of the float by means of screws 76 or other suitable means. Each plate has a web 78 integral therewith or otherwise suitably secured thereto, each web extending through a slot 80 in the wall of the pipe 10 extending longitudinally of the pipe and diametrically opposite each other. The webs 78 are attached by welding or other suitable means to a lower end portion 82 of a cam shaft, indicated generally at 84. Extending upwardly from the lower portion 82, the cam shaft has a series of spool like cams, indicated generally at 88. These cams have reduced diameter portions 90 between substantially full diameter parts 92, the reduced diameter parts being concavely arcuate when viewed from the side. The portion of the cam shaft having the cams extends substantially upwardly of the rollers 42 at lowest tide, said rollers riding at all times on the cams for effecting inward and outward movement of the pistons, the springs 52 forcing the pistons inwardly so that the rollers follow the configuration of the cams as the cam shaft moves upwardly and downwardly in accordance with the wave action on the float 70.

Cam shaft 84 has a cylindrical part 96 at its upper end that is slidably received within an upper end part 98 of the pipe 10 above the cylinders and a spring 100 is disposed within the upper end portion or part 98 of pipe 10, the spring reacting between the cylindrical parts 96 of the cam shaft and a wall 102 at the upper end of pipe 10. Spring 100 is of suitable length and strength to exert downward pressure on the cam shaft regardless of the operative positions of said cam shaft due to the variations in the tides and to the action of the waves on the float 70.

In order to prevent undesirable pressures in the top portion 98 of the pipe 10 as the cam shaft moves upwardly and downwardly the cylindrical part 96 of said cam shaft can have a loose enough fit within the pipe portion 98 to permit bypassing of the cylindrical part 96 by air. Alternatively a relief port could be provided in the part 98 of the pipe 10, above the cylindrical part 96 of the cam shaft for venting pressures in the cylinders between the pistons and the upper end portion 98 of the pipe 10 to atmosphere. Also, to prevent undesirable pressures of the cylinders between the pistons and the partitions 40 the openings 38 in partitions 40 are of greater diameter than the pistons rods 36 so that air can bypass the piston rods as the pistons move back and forth in the cylinders 28.

The cylinders have respective oil cups 108 for providing oil or other suitable lubricant to the interior of said cylinders, said oil cups being of any suitable well known character.

In summary, the float 70 is raised and lowered as it floats on the waves and correspondingly raises and lowers the cam shaft 84 which in turn causes the pistons in the respective cylinders to move inwardly and outwardly as the rollers ride on and follow the cams of the cam shaft.

Fluid, such as air or other gas, or a liquid which may be water, is drawn into the cylinders by way of conduits 54 as the pistons move inwardly and such fluid is forced out of the cylinders into the conduits 60 as the pistons move outwardly in the respective cylinders. The conduits 60 may be connected to a suitable reservoir where pressure may be built up as the apparatus operates, or the conduits 60 could lead to a mechanism operated by the pressure of fluid supplied through said conduits 60.

Ocean water could be pumped to elevated reservoirs from which the water could be taken to run turbines or the like.

The pumping cylinders and pistons are positioned above high tide and the spring 100 which aids gravity in effecting downward movement of the cam shaft is long enough to take care of the various operating positions of the cam shaft due to variations in the tides and movements of the waves. As described above the cam shaft is long enough so that there will be cams operably positioned with respect to the rollers 42 of the pumps regardless of the height of the tides.

The slots 80, in which the webs 78 slide as the float moves upwardly and downward, are also long enough so that the float will be operable to move the cam shaft regardless of the variations in the tide and the waves.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned except as defined in the accompanying claims.

I claim:
1. Pumping apparatus, comprising:
   (A) support means adapted to be anchored in an upright position;
   (B) an elongated substantially vertical cam shaft operably supported by said support means, said cam shaft having a series of cams along at least a portion of its length;
   (C) a float attached to said cam shaft whereby operable movements of said float impart corresponding longitudinal movements of said cam shaft;
   (D) at least one fluid pump carried by said support means, said pump having a cylinder with an inlet and an outlet, and a piston reciprocally mounted in said cylinder;
   (E) and means operably engageable with cams of the cam shaft as the latter is operably moved by the float for actuating the pistons.

2. The invention defined by claim 1, wherein the cams effect movement of the piston in one direction; and there is yielding means urging the piston in the opposite direction.

3. The invention defined by claim 1, wherein there is spring means for yieldingly urging the cam shaft downwardly.

4. The invention defined by claim 1, wherein the cams have substantially maximum diameter parts spaced apart longitudinally of the cam shaft with reduced diameter parts between the maximum diameter parts, the reduced diameter parts being arcuately concave throughout their entire circumference.

5. The invention defined by claim 1, wherein the cam shaft is elongated sufficiently so as to accommodate to variations in the heights of tides when the apparatus is installed in a body of water having tides and also to the height of waves at the various tides.

6. The invention defined by claim 5, including a spring yieldingly urging the cam shaft downwardly to aid gravity in moving the cam shaft downwardly as the float moves downwardly with lowering waves.

7. The invention defined by claim 1, wherein the means operably engageable with cams of the cam shaft comprises a piston rod, and a roller carried by said piston rod and riding on the cams; and said cylinder has an interior partition intermediate its ends, said partition having an opening therein through which the piston rod extends; a piston rod support attached to said piston rod and slidable in the cylinder inwardly of the partition; and a spring on said piston rod and reacting between the partition and the piston rod support for urging the piston, piston rod and roller toward the cam shaft so that the roller rides on the adjacent cams of the cam shaft.

8. The invention defined by claim 1, wherein the support means comprises a tubular pipe in which the cam shaft longitudinally slides, said pipe having slots extending longitudinally thereof and wherein the float is doughnut shaped and slidable on said pipe; and means extending through said slots and secured to said cam shaft whereby operable movements of the float effect corresponding operable movements of the cam shaft.

9. The invention defined by claim 8, wherein there are a plurality of pumps annularly spaced apart on said pipe, the latter having openings therein through which the rollers and piston rods of the pumps extend so that the rollers operably ride on adjacent cams of the cam shaft as said cams come into alignment with the rollers; there being a portion of the pipe extending upwardly of the pumps; and a spring in said portion of the pipe acting on the upper end of the cam shaft to yieldingly urge same downwardly.

References Cited
UNITED STATES PATENTS 328,759 10/1885 Chandler _____ 103—70
793,497 6/1905 Ariztia _____ 103—66

ROBERT M. WALKER, *Primary Examiner.*